(12) United States Patent
Sauder et al.

(10) Patent No.: US 12,161,073 B2
(45) Date of Patent: Dec. 10, 2024

(54) CROP INPUT APPLICATION SYSTEMS, METHODS, AND APPARATUS

(71) Applicant: MA Industries, LLC, Morton, IL (US)

(72) Inventors: Gregg A. Sauder, Morton, IL (US);
Timothy Sauder, Morton, IL (US);
Justin L. Koch, Morton, IL (US);
Nowell Moore, Morton, IL (US);
Jonathan T. Welte, Morton, IL (US);
Reid Aberle, Morton, IL (US); Steven Nuest, Morton, IL (US)

(73) Assignee: MA Industries, LLC, Morton, IL (US)

( * ) Notice: Subject to any disclaimer, the term of this patent is extended or adjusted under 35 U.S.C. 154(b) by 663 days.

(21) Appl. No.: 17/295,417

(22) PCT Filed: Nov. 7, 2019

(86) PCT No.: PCT/US2019/060348
§ 371 (c)(1),
(2) Date: May 19, 2021

(87) PCT Pub. No.: WO2020/106465
PCT Pub. Date: May 28, 2020

(65) Prior Publication Data
US 2022/0007597 A1 Jan. 13, 2022

Related U.S. Application Data

(60) Provisional application No. 62/769,378, filed on Nov. 19, 2018.

(51) Int. Cl.
*A01G 25/16* (2006.01)
*A01G 25/09* (2006.01)

(52) U.S. Cl.
CPC ......... *A01G 25/167* (2013.01); *A01G 25/092* (2013.01)

(58) Field of Classification Search
CPC ..... A01G 25/09; A01G 25/092; A01G 25/167
(Continued)

(56) References Cited

U.S. PATENT DOCUMENTS

| | | | |
|---|---|---|---|
| 4,119,272 | A | 10/1978 | Tidwell |
| 4,230,275 | A | 10/1980 | Tidwell |

(Continued)

FOREIGN PATENT DOCUMENTS

| | | |
|---|---|---|
| CN | 104813904 A | 8/2015 |
| WO | 2014035169 A1 | 3/2014 |

OTHER PUBLICATIONS

Supplementary European Search Report, Application No. 19888192. 2, mailed Jul. 14, 2022, 1 page.

(Continued)

*Primary Examiner* — Steven J Ganey
(74) *Attorney, Agent, or Firm* — Todd R. Fronek; Larkin Hoffman Daly & Lindgren, Ltd.

(57) ABSTRACT

Crop input application systems, methods and apparatus are provided. In some embodiments, an irrigation system is provided with a reel in fluid communication with a wellhead, secondary cart or fluid supply line outlet. In some embodiments, a drop assembly is incorporated in an irrigation system. In some embodiments, a crop applicator system traverses a field portion at a first speed in a first direction and then traverses the field portion at a second, lower speed in a second, opposite direction.

13 Claims, 9 Drawing Sheets

(58) Field of Classification Search
USPC .................... 239/195–198, 723–745, 63–65
See application file for complete search history.

(56) References Cited

U.S. PATENT DOCUMENTS

| | | | | |
|---|---|---|---|---|
| 4,763,836 | A * | 8/1988 | Lyle ................. | A01G 25/09 239/69 |
| 5,927,603 | A * | 7/1999 | McNabb ............ | A01G 25/167 239/728 |
| 8,662,424 | B2 * | 3/2014 | Meis .................. | A01G 25/092 239/727 |
| 9,974,245 | B2 * | 5/2018 | Parod ................ | A01M 7/0075 |
| 11,388,868 | B2 * | 7/2022 | LaRue ............... | C05G 3/70 |

OTHER PUBLICATIONS

Extended European Search Report, Application No. 19888192.2, mailed Jun. 27, 2022, 8 pages.
International Preliminary Report on Patentability, Application No. PCT/US2019/060348, mailed May 25, 2021, 5 pages.
International Search Report and Written Opinion, pplication No. PCT/US2019/060348, mailed Jan. 14, 2020, 6 pages.
Wang, Cheng. China Self-Propoelled Sprayer, 3WPZ Self Propelled Boom Sprayer, Jul. 28, 2017, as available at. https://www.youtube.com/watch?v=tBHDc0be_9w.
F/S Mfg. Owner's Manual: F/S UTV Skid Sprayer, Jan. 31, 2017, http://www.fsmfg.com/wp-content/uploads/2019/05/UTV-Skid-Sprayer-Owners-Manual.pdf.

* cited by examiner

CROP INPUT APPLICATION SYSTEMS, METHODS, AND APPARATUS

RELATED APPLICATIONS

The disclosure is a PCT application claiming the priority benefit of U.S. provisional patent application Ser. No. 62/769,378 filed on Nov. 19, 2018, which is hereby incorporated by reference herein in its entirety.

BACKGROUND

Applicators such as irrigation systems, sprayers, sidedress bars, etc., are used to apply one or more crop inputs; some embodiments are used to apply one or more crop inputs to a standing crop.

SUMMARY

In one embodiment, a crop input application vehicle is disclosed. The crop input application vehicle includes a transversely extending boom, a plurality of wheel assemblies, a reel, and a plurality of applicators. The plurality of wheel assemblies at least partially support the boom. The wheel assemblies are operable to maneuver the boom. The reel is supported on the boom. The reel supports a conduit. The conduit can be extended from or retracted onto the reel. The conduit is configured to be connected to a water source. The plurality of applicators is supported on the boom. Each application is in fluid communication with the conduit.

In another embodiment, a method of applying crop input is disclosed. In one step, a crop applicator traverses a field portion at a first speed in a first direction. In another step, the crop applicator traverses the field portion at a second speed and in a second direction opposite the first direction.

The scope of the present disclosure is defined solely by the appended claims and is not affected by the statements within this summary.

DESCRIPTION

Figure 1:
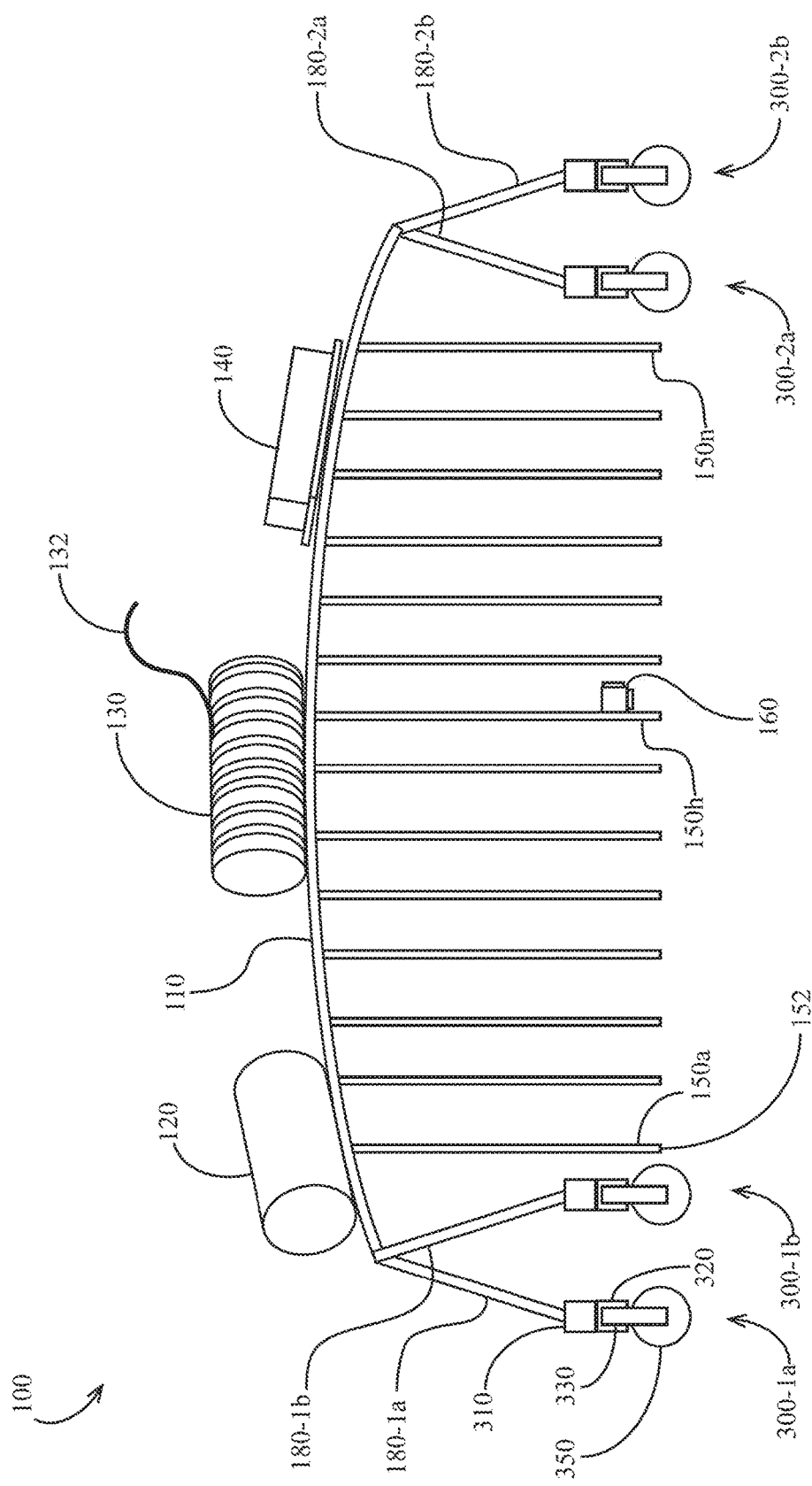
FIG. 1 is a perspective view of one example of a crop input applicator.

Referring now to the drawing figures wherein like reference numerals designate the same or corresponding components throughout the several figures, FIG. 1 illustrates a crop input applicator 100 which may have one or more similar or common features with a linear irrigator. The applicator 100 optionally includes a boom 110 supported on a plurality of support legs 180. The boom 110 optionally comprises a conduit extending generally transversely across the applicator 100. The boom 110 optionally includes a plurality of applicators which may comprise transversely spaced outlets 152 which may be disposed on drop assemblies 150 (e.g. 150a through 150n).

Each drop assembly 150 optionally includes a conduit (e.g., flexible conduit) in fluid communication with the boom 110 and in fluid communication with the outlet 152. In some embodiments, the outlet 152 is relatively restrictive (e.g., more restrictive than one or more outlets provided in the boom 110). One or more pumps 920 (see FIG. 9) and/or valves 940 (see FIG. 9) of the applicator 100 optionally control the flow rate of fluid (e.g., water) exiting a single outlet 152 and/or a plurality of outlets 152. One or more flow sensors 930 (see FIG. 9) of the applicator 100 optionally measure the flow rate of fluid (e.g., water) exiting a single outlet 152 and/or a plurality of outlets 152.

Figure 8:
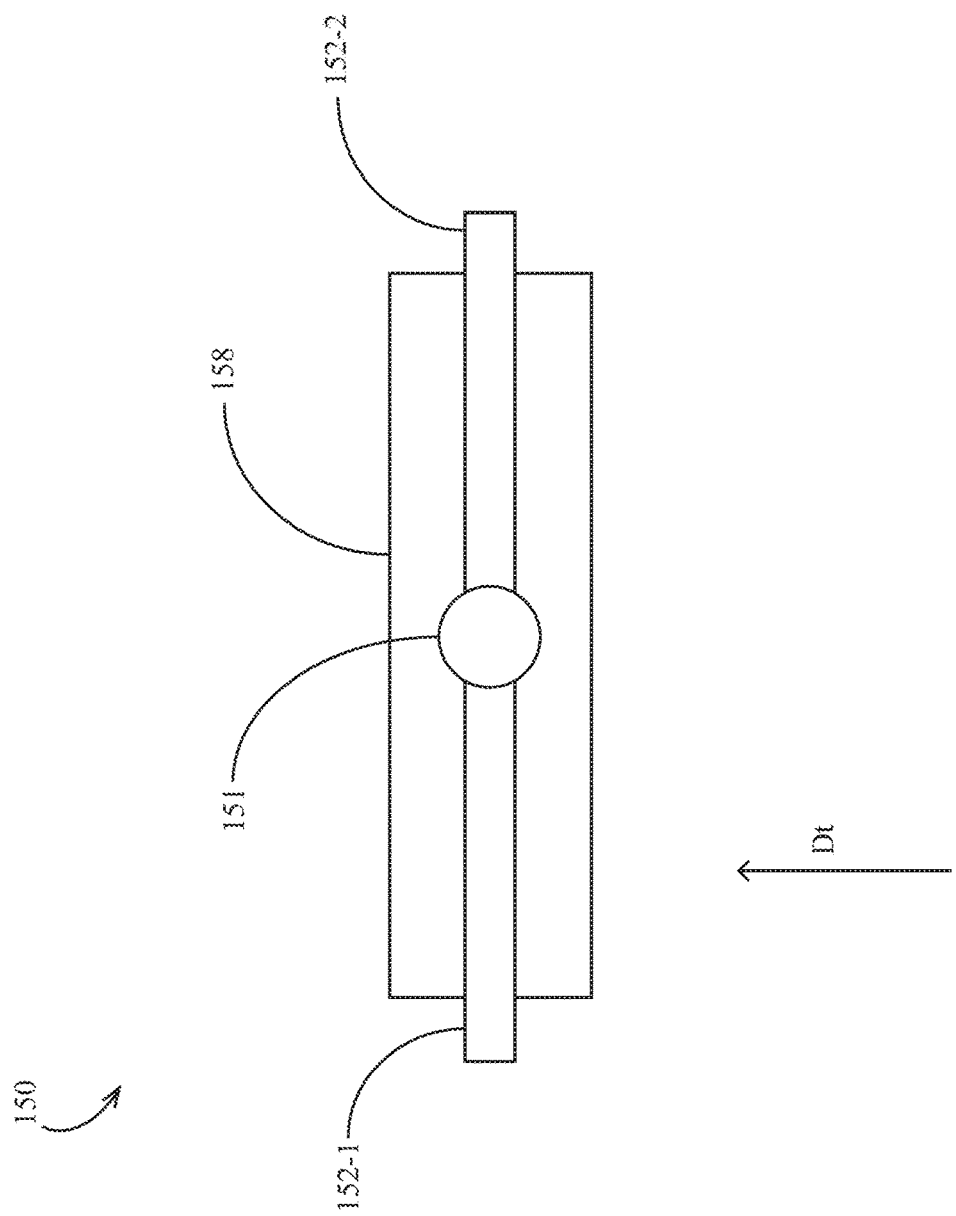
FIG. 8 is a top view of one example of a drop assembly.

In some embodiments, one or more of the drop assemblies 150 include common structure and/or features with one or more embodiments disclosed in U.S. Pat. No. 9,167,745, hereby incorporated by reference herein in its entirety. In other embodiments, such as the drop assembly 150 illustrated in FIG. 8, a base 158 which supports two outlets 152-1, 152-2 which are optionally oriented transverse to the longitudinal direction of travel Dt of the applicator 100. The base 158 is optionally supported on a downwardly extending support 151 which is optionally mounted (e.g., directly, indirectly, by welding, by U-bolts or other fasteners, etc.) to the boom 110 or other structure of the applicator 100. The outlets 152 optionally comprise outlets of flexible conduits supported on the drop assembly 150.

Referring to FIG. 1, in some embodiments, one or more sensors 160 are coupled to one or more drop assemblies 150, e.g., to a generally lower end of one or more drop assemblies. In the illustrated example, only one sensor 160 is illustrated to demonstrate principles of the present disclosure. However, it should be understood that sensors 160 may be coupled to any number of the drop assemblies 150 including none of the drop assemblies 150, all of the drop assemblies 150, and anywhere between none and all of the drop assemblies 150.

Figure 2:
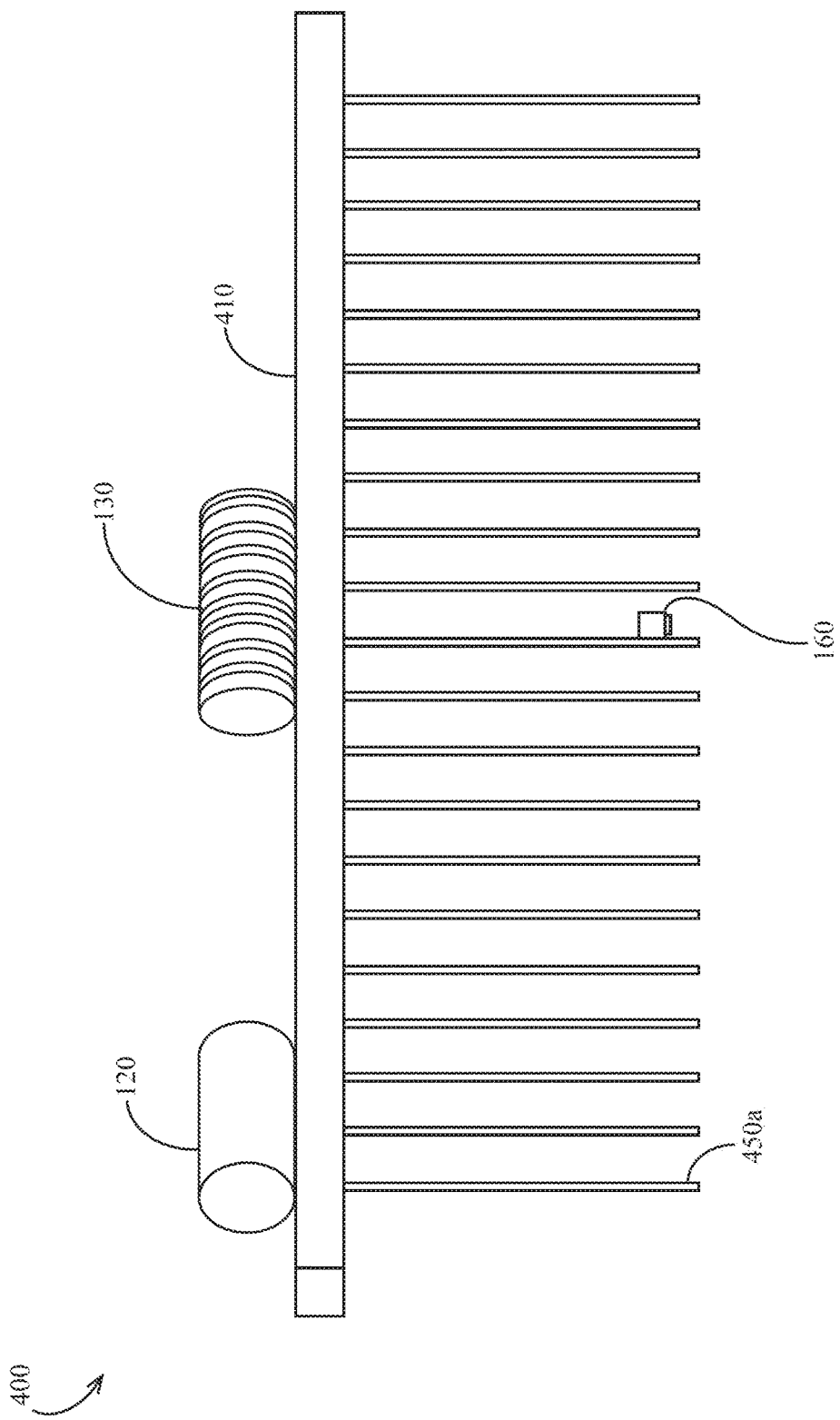
FIG. 2 is a perspective view of another example of a crop input applicator.

Referring to FIG. 2, another embodiment of an applicator 400 having drop assemblies 450 (e.g. 450a through 450u) supported on a transversely extending toolbar 410 is illustrated. The toolbar 410 optionally supports a container 120 and/or a reel 130. The toolbar 410 is optionally supportable on and/or towable by a tractor or other vehicle.

In some embodiments, one or more sensors 160 are optionally configured to measure one or more soil-related criteria (e.g., soil moisture, soil temperature, soil reflectivity, soil color, soil electrical conductivity, soil organic matter, soil cation exchange capacity, etc.). In some embodiments, one or more sensors 160 comprise a remote sensor that does not contact the soil but is optionally oriented toward the soil. In some embodiments, one or more sensors 160 comprise a contact sensor that engages the surface and/or subsurface of the soil.

In some embodiments, one or more sensors 160 are optionally configured to measure one or more crop-related criteria (e.g., crop color, crop reflectivity, stalk diameter, crop presence, crop population, crop spacing, crop uniformity, etc.). In some embodiments, one or more sensors 160 comprise a remote sensor that does not contact the crop but is optionally oriented toward the crop (e.g., transverse to travel direction Dt). In some embodiments, one or more sensors 160 comprise a contact sensor that contacts the crop (e.g., a stem, leaf, etc.).

In some embodiments, the applicator 100 has a sub-field width such as, for example, 120 ft., 240 ft., between 120 and 240 ft., etc. In alternative embodiments, the applicator 100 may be substantially the width of a field. In some embodiments, the applicator 100 may include one drop assembly 150 optionally positioned for every crop row (e.g., every 30 inches in 30 inch rows). In some embodiments, the total number of drop assemblies 150 is between 40 and 100. In some embodiments, a 120-foot applicator 100 has forty-eight drop assemblies 150 or approximately forty-eight drop assemblies 150. In some embodiments, a 240-foot applicator has ninety-six drop assemblies 150 or approximately ninety-six drop assemblies 150.

The applicator 100 is optionally rollingly supported on one or more wheel assemblies 300. For example, one or more support legs 180 is/are optionally supported on a wheel assembly 300. Each wheel assembly 300 (e.g. 300-1a, 300-1b, 300-2a, 300-2b) optionally includes an upper portion 310 (which may be mounted to a respective support leg e.g. 180-1a, 180-1b, 180-2a, 180-2b) and a lower portion 320 which is optionally pivotally coupled to the upper portion 310, e.g., for pivoting about a vertical axis. In some embodiments, an actuator 965 (see FIG. 9) is configured to steer the wheel assembly 300, e.g., to pivot the lower portion 320 relative to the upper portion 310. A wheel 350 is optionally rollingly supported on the wheel assembly 300. In some embodiments, the wheel 350 is rollingly supported on a downwardly extending support 330 which is optionally mounted to the lower portion 320. In some embodiments, the wheel 350 of one or more wheel assemblies 300 is driven in order to move the applicator 100 along the direction of orientation of the wheel 350; in some embodiments, the wheel 350 is driven for rotation by a motor 960 (see FIG. 9) such as an electric motor, which motor 960 may be operably coupled to an axle of the wheel 350 and which motor 960 may be supported on the downwardly extending support 330 or other component of the wheel assembly 300.

In some embodiments, a flexible conduit 132 is supported on the applicator 100. The flexible conduit 132 is optionally supported on (e.g., coiled about) a reel 130. The reel 130 may be self-winding (e.g., torsionally spring-biased) and/or feature one or more winding mechanism and/or a shuttle or other mechanism for guiding the conduit 132 into position. The conduit 132 optionally has an outlet end in fluid communication with boom 110. The conduit 132 optionally has an inlet end which may be displaced to a location remote from the applicator 100 (e.g., by unwinding reel 130) and which is optionally configured to be in fluid communication with a primary crop input source (e.g., water source such as a wellhead outlet or other outlet).

In some embodiments, a secondary crop input container 120 (e.g., liquid tank) is supported on the applicator 100. The container 120 may be fluidly coupled to the boom 110 or to one or more separate outlets for applying a secondary crop input (e.g., fertilizer, insecticide, herbicide, biological, etc.) to a field. A pump (not shown) may be associated with the secondary crop input container 120 and used to move secondary crop input to control the flow rate of the secondary input.

In some embodiments, a power source 140 (e.g., generator) is supported on the applicator 100 and in electrical communication with one or more power-consuming devices (e.g., motors, pumps, etc.) on the applicator 100.

In various embodiments, the device or devices used to store conduit 132 may take on various forms. For example, a plurality of reels may be disposed along the width of boom 110 and may be fluidly coupled (e.g., selectively fluidly coupled) to one another. The conduit 132 optionally at least partially comprises hard (e.g., non-flattening) flexible tubing. Also or alternatively, the conduit 132 optionally at least partially comprises flat tubing which may become generally flat when the tubing is not filled with water and expand when the tubing is filled with water. In some embodiments, during operation the conduit 132 includes a filled portion supported on the applicator 100 and a non-filled (e.g., empty) portion supported on the applicator 100.

Figure 3:
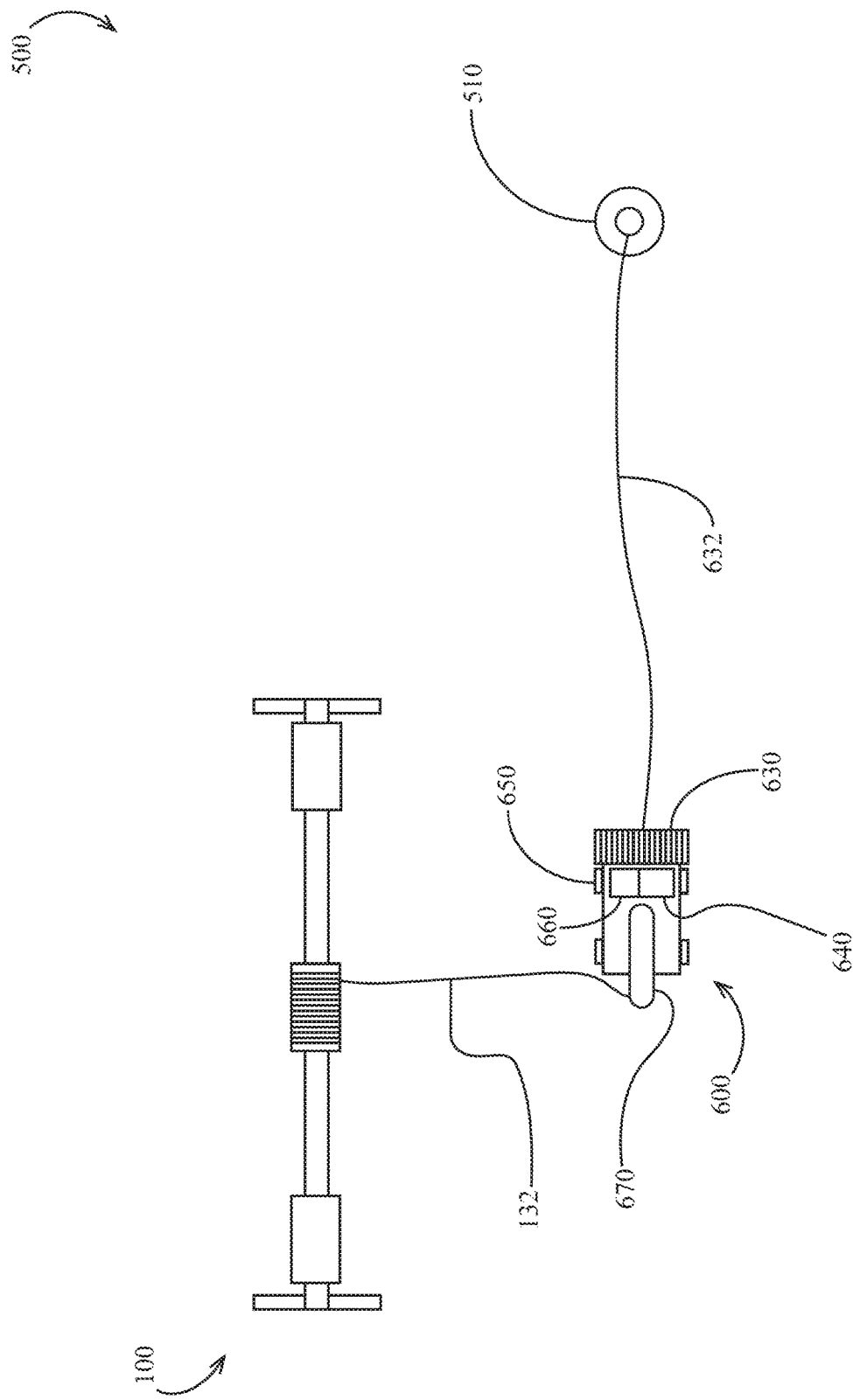
FIG. 3 is a plan view of an embodiment of a crop input application system.

Referring to FIG. 3, a crop input application system 500 is illustrated. An applicator 100 (or other applicator embodiment) is in fluid communication with a wellhead 510 (or other water source) via conduit 132. In some embodiments, a cart 600 is used to position the conduit 132 (e.g., relative to the applicator 100 and/or the wellhead 510) in operation. The cart 600 optionally includes a reel 630 (e.g., self-winding or power-winding reel) operably supporting a conduit 632 which is optionally in fluid communication with the well head 510. The conduit 632 is optionally in fluid communication with the conduit 132. An optional pump 640 optionally increases pressure and/or flow rate of water traveling from conduit 632 to conduit 132. A moveable (e.g., pivoting) arm 670 optionally supports the conduit 132 and is optionally powered in order to reposition the conduit 132. A motor 660 (e.g., electric motor) optionally moves the cart 600 on wheels 650 (e.g., including one or more caster wheels and/or steerable wheels) such that the cart 600 is optionally self-powered and maneuverable.

Figure 4:
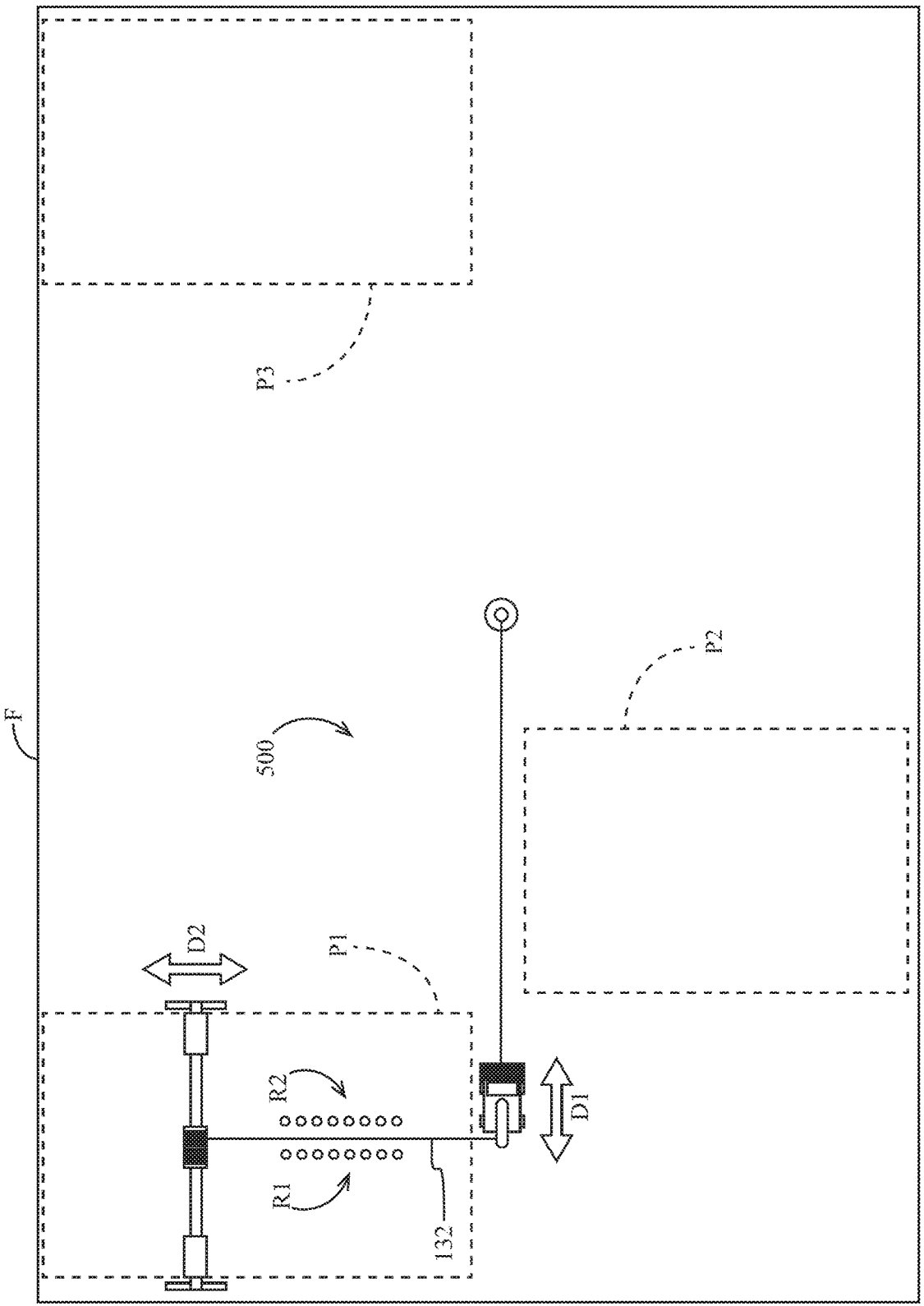
FIG. 4 is a schematic view illustrating the crop input application system of FIG. 3 in one example of an environment such as a field.

Referring to FIG. 4, the system 500 may be used to apply crop input to various portions P (e.g., P1, P2, P3, etc.) of a field. For example, the cart 600 optionally moves along directional axis D1 to align the conduit 132 between two rows of standing crop R1 and R2 within portion P1. The applicator 100 optionally moves along directional axis D2 in order to apply crop input on the portion P1. In some embodiments, the applicator 100 moves along a first direction along directional axis D2 (e.g., upward on the view of FIG. 4) to apply a first application of crop input, and then moves along a second, opposite direction along directional axis D2 (e.g., downward on the view of FIG. 4) to apply a second application of crop input (e.g., at a higher application rate, flow rate, and/or system pressure than the first application).

Figure 5:
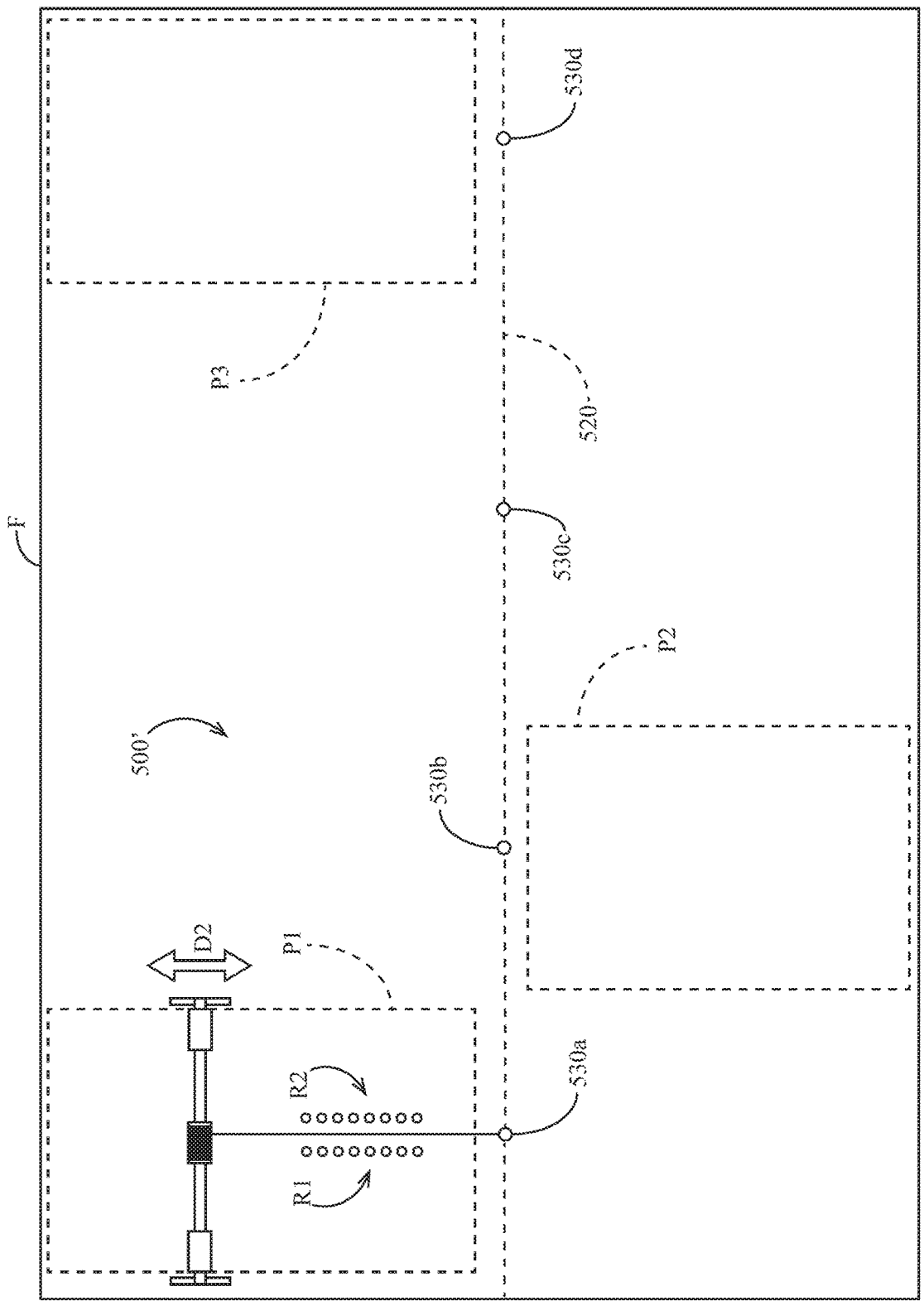
FIG. 5 is a schematic view illustrating another example of a crop input application system in one example of an environment such as a field.

Referring to FIG. 5, a modified system 500' (or the system 500 or another application system) may be used with a plurality of water outlets 530 (e.g. 530a through 530d) provided along a water supply line 520 which optionally extends at least partially across the width of the field F. The modified system 500' optionally does not include a cart 600; the conduit 132 is optionally coupled to an outlet 530 while the applicator 100 traverses a field portion P adjacent to the outlet 530.

Figure 6:
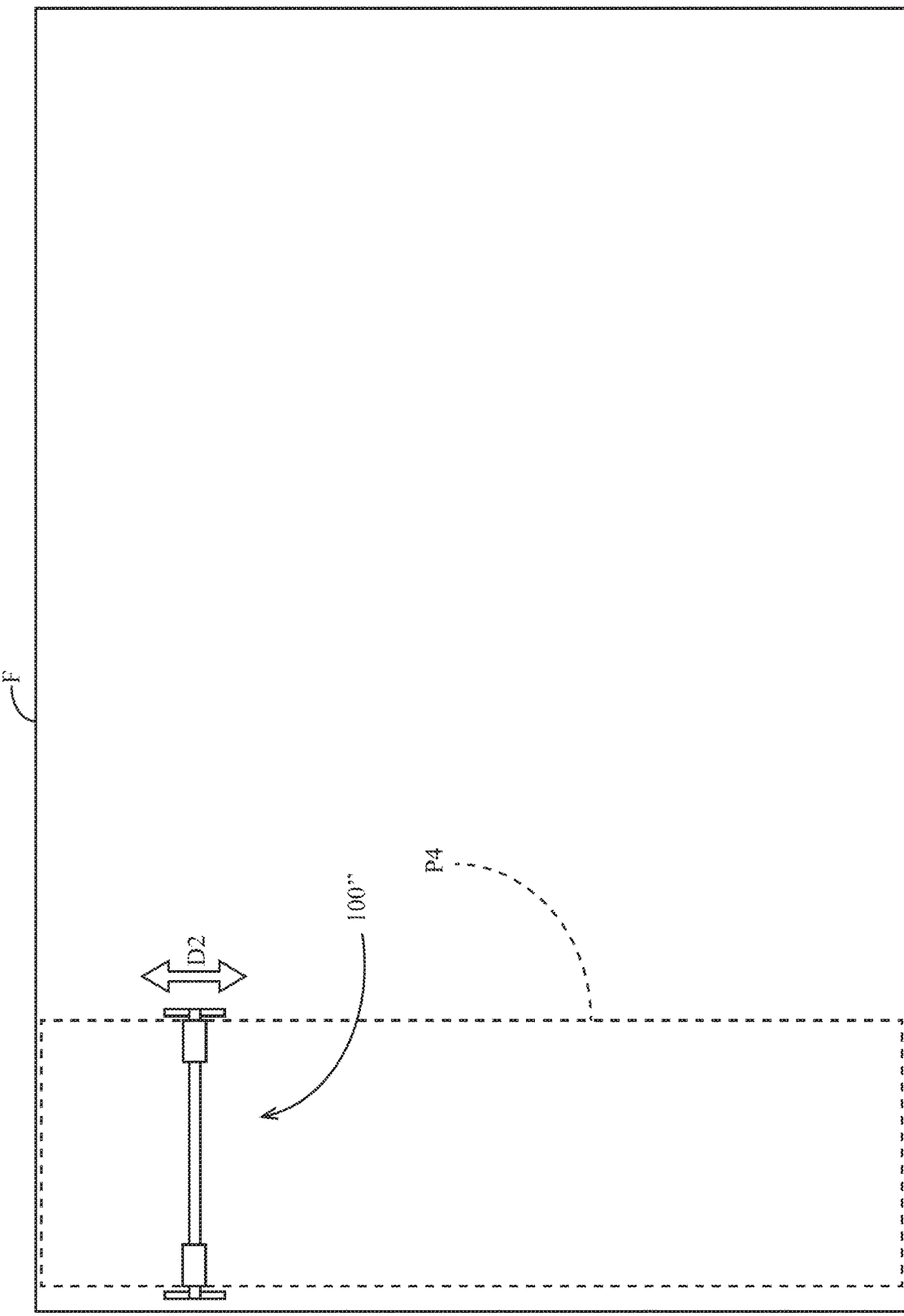
FIG. 6 is a schematic view illustrating another example of a crop input applicator system in one example of an environment such as a field.

Referring to FIG. 6, a modified applicator 100" (e.g., optionally omitting a reel, etc.) may be used to apply a secondary crop input to the field F, e.g., by traversing a portion such as P4 which optionally extends substantially across a length of the field (e.g., a portion of the field excluding headlands, etc.).

Figure 9:
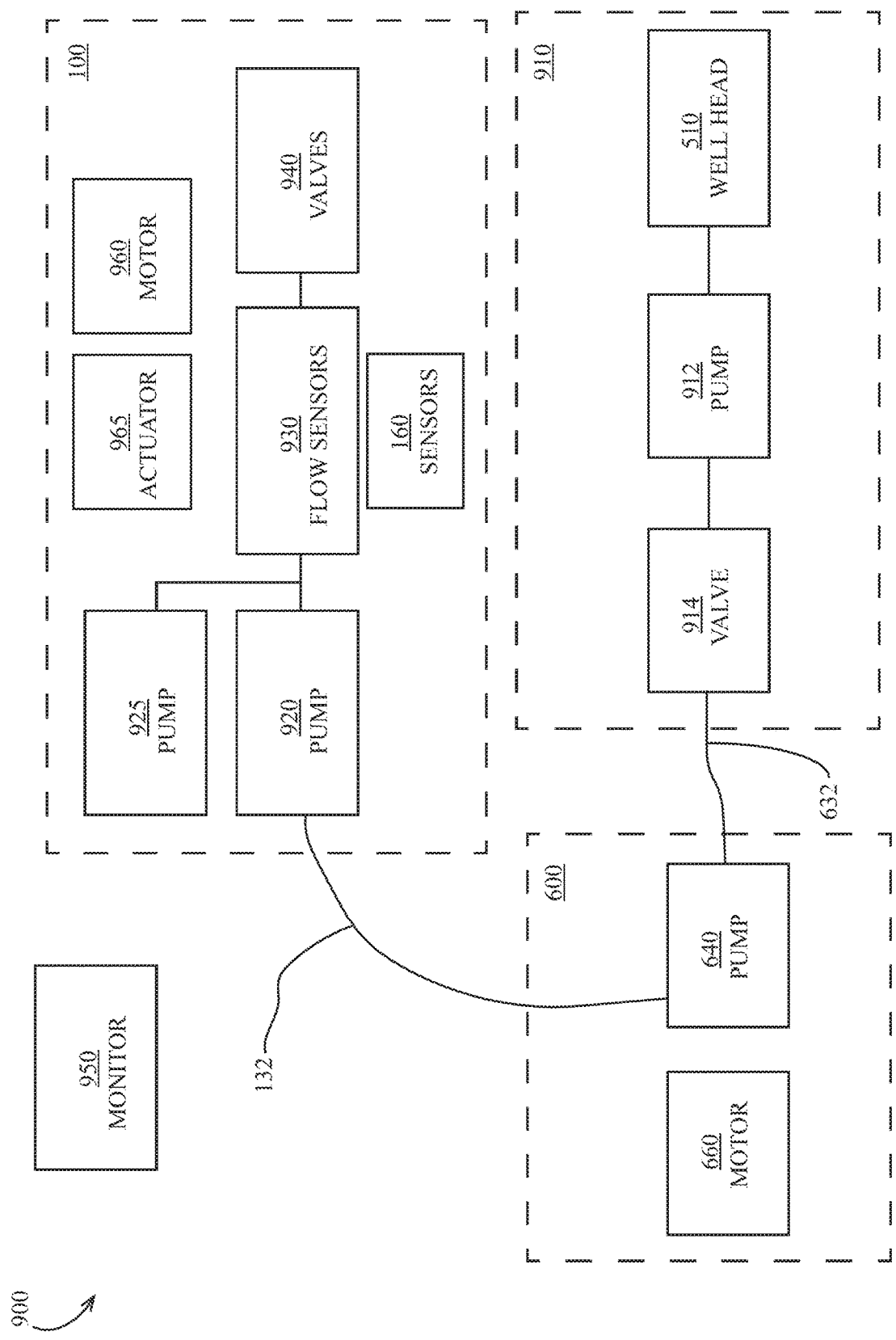
FIG. 9 is a schematic view of one example of a control and/or monitoring system.

Referring to FIG. 9, a control and/or monitoring system 900 is illustrated. A monitor 950 is optionally in data communication with various components of the system 900 for controlling and/or monitoring the system 900. A well head subsystem 910 of the system 900 optionally includes a pump 912 in fluid communication with the well head 510 (e.g., for increasing supply pressure of water supplied by the well head) and/or a valve 914 (e.g., on-off valve, flow control valve, pressure control valve, etc.) in fluid communication with the well head 510. The well head 510 is optionally in fluid communication with a pump 640 of the cart 600. The well head 510 and/or the pump 640 are optionally in fluid communication with a pump 920 supported on the applicator 100. Water applied by the well head 510 optionally passes through one or more flow sensors 930 (e.g., a row-specific flow sensor which may be supported on a drop assembly, an applicator-wide flow sensor which may be supported on the boom, etc.) and/or valves 940 (e.g., a row-specific valve which may be supported on a drop assembly, an applicator-wide valve which may be supported on the boom, etc.). A secondary pump 925 is optionally used to supply a secondary crop input to one or more outlets 152; in some embodiments, the secondary crop input passes through flow sensors 930 and valves 940, or through one or more separate valves and/or sensors. In some embodiments, the secondary crop input is injected into a flow of primary crop input such as water (e.g., via boom 110).

Figure 7:
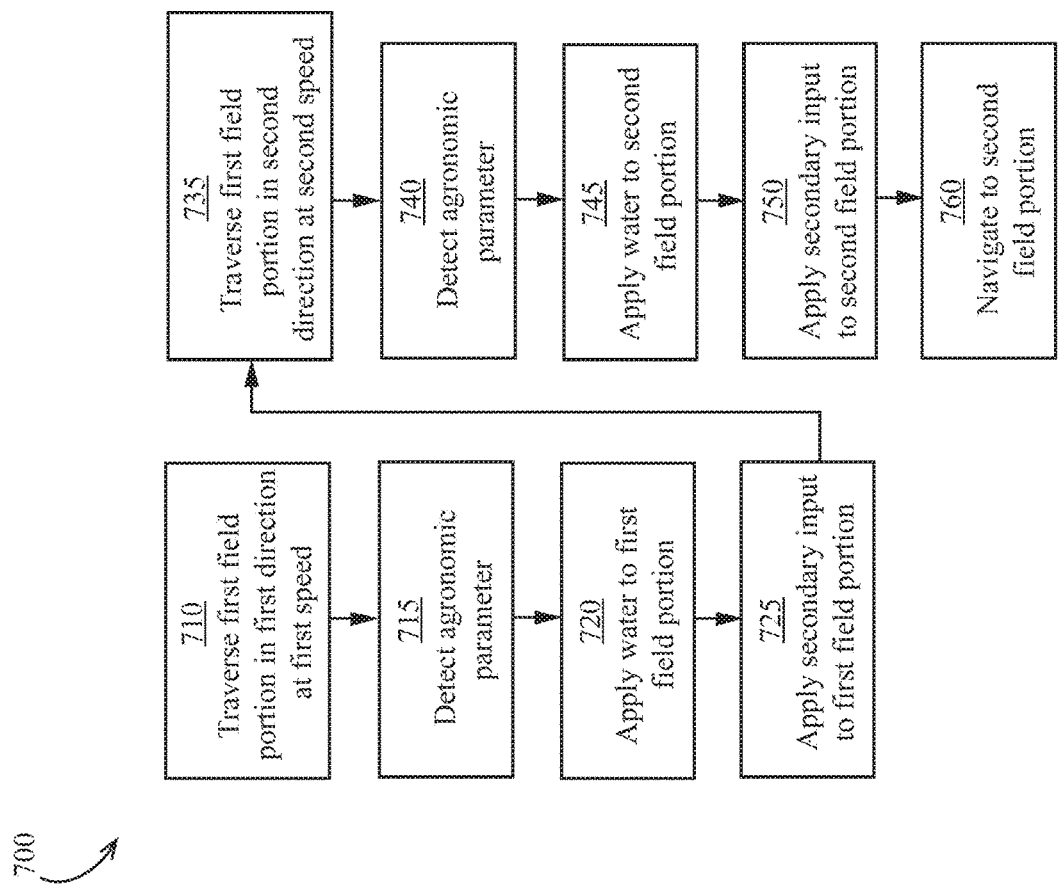
FIG. 7 is a flow chart illustrating one example of a method of applying a crop input.

Referring to FIG. 7, a method 700 for controlling an application system (e.g., the system 900) is illustrated. At step 710, the applicator 100 optionally traverses a first field portion in a first direction at a first speed. At step 715, one or more sensors 160 of the application 100 optionally detect one or more agronomic parameters (e.g., soil-related criteria, crop-related criteria, etc.) while the applicator 100 traverses the field. At step 720, the applicator 100 optionally applies water to the first field portion. At step 725, the applicator 100 optionally applies a secondary crop input to the first field portion.

At step 735, the applicator 100 optionally traverses the first field portion in a second (e.g., opposite) direction at a second (e.g., lower) speed. At step 740, one or more sensors 160 of the applicator 100 optionally detect one or more agronomic parameters (e.g., soil-related criteria, crop-related criteria, etc.) while the applicator traverses the field. At step 745, the applicator 100 optionally applies water (e.g., at a higher or lower rate than at step 720) to the first field portion. At step 750, the applicator 100 optionally applies a secondary crop input to the first field portion (e.g., at a higher or lower rate than at step 725). At step 760, the applicator optionally navigates to a second field portion. Step 760 optionally includes navigating the applicator 100 in a direction non-parallel to the first and second directions of method 700 (e.g., by turning one or more wheels 350 such as by one or more actuators).

Various modifications to the embodiments and the general principles and features of the apparatus, systems, and methods described herein will be readily apparent to those of skill in the art. Thus, the foregoing description is not to be limited to the embodiments of the apparatus, systems, and methods described herein and illustrated in the drawing figures.

The invention claimed is:

1. A crop input applicator adapted to apply a crop input to a field, the field having a crop input source, the crop input applicator comprising:
   a frame rollingly supported on a plurality of wheels, wherein at least one of said plurality of wheels is a drive wheel capable of moving said frame in a first direction of travel and in a second direction of travel opposite said first direction of travel;
   a boom supported on said frame above a soil surface of the field, said boom extending transverse to said first and second direction of travel, said boom supporting a plurality of spaced applicators;
   a reel rotationally supported on said frame above the soil surface of the field, said reel supporting a length of conduit wound thereon, an inlet end of said length of conduit coupled to the crop input source, an outlet end of said length of conduit communicating a crop input from the crop input source to said plurality of spaced applicators;
   whereby, as said frame moves in said first direction of travel and away from the crop input source, said reel rotates in a first rotation direction such that a portion of said length of conduit is unwound from said reel onto the soil surface of the field; and
   whereby, as said frame moves in said second direction of travel back toward the crop input source, said reel rotates in a second rotation direction such that said unwound portion of said length of conduit on the soil surface is rewound back onto said reel.

2. The crop input applicator of claim 1, wherein each of said plurality of wheels is pivotable with respect to said frame and wherein said drive wheel includes an actuator configured to steer the drive wheel by pivoting said drive wheel with respect to said frame.

3. The crop input applicator of claim 1, wherein each of said plurality of applicators comprises a drop assembly extending downwardly from said boom toward the soil surface of the field.

4. The crop input applicator of claim 1, further comprising:
   a secondary crop input container in fluid communication with said plurality of applicators.

5. The crop input applicator of claim 4, wherein said secondary crop input container is supported on said frame.

6. The crop input applicator of claim 1, wherein said crop input source is a wellhead or a fluid supply line outlet.

7. The crop input applicator of claim 1, further comprising: a sensor configured to detect an agronomic parameter selected from the group consisting of soil moisture, soil temperature, soil reflectivity, soil color, soil electrical conductivity, soil organic matter, soil cation exchange capacity, crop color, crop reflectivity, crop stalk diameter, crop presence, crop population, crop spacing, and crop uniformity.

8. The crop input applicator of claim 7, wherein said sensor is one of a contact sensor or a non-contact sensor.

9. A method of applying a crop input to a field, the method comprising:
   (a) positioning a vehicle in a first portion of the field, said vehicle including:
      a frame rollingly supported on a plurality of wheels, wherein at least one of said plurality of wheels is a drive wheel capable of moving said frame in a first direction of travel and in a second direction of travel opposite said first direction of travel;
      a boom supported on said frame above a soil surface of the field, said boom extending transverse to said first and second direction of travel, said boom supporting a plurality of spaced applicators;
      a power source supported on said frame, said power source operably powering said drive wheel;
      a reel rotationally supported on said frame above the soil surface of the field, said reel supporting a length of conduit wound thereon, said length of conduit having an inlet end and an outlet end, said outlet end of said length of conduit in fluid communication with said plurality of spaced applicators;

(b) coupling said inlet end of said length of conduit to a crop input source disposed within the field;

(c) communicating a crop input from said crop input source through said length of conduit;

(d) driving said drive wheel to cause said vehicle to move in the first portion of the field in said first direction of travel and away from said crop input source, whereby, as said frame moves in said first direction of travel, said reel rotates in a first rotation direction such that a portion of said length of conduit is unwound from said reel onto the soil surface of the first portion of the field; and (e) driving said drive wheel to cause said vehicle to move in the first portion of the field in said second direction of travel and back toward said crop input source, whereby, as said frame moves in said second direction of travel, said reel rotates in a second rotation direction such that said unwound portion of said length of conduit is rewound back onto said reel, and whereby as said vehicle moves in said second direction of travel, applying said crop input through the plurality of applicators to the first portion of the field at a first application rate.

10. The method of claim 9, further comprising:
when said vehicle moves in the first portion of the field in said first direction of travel, applying said crop input through the plurality of applicators at a first application rate.

11. The method of claim 10, further comprising:
when said vehicle moves in the first portion of the field in said second direction of travel, applying said crop input through the plurality of applicators at a second application rate, wherein the second application rate is different from the first application rate.

12. The method of claim 9, further comprising:
after applying the crop input to the first portion of the field, navigating the crop applicator to a second portion of the field;

driving said drive wheel to cause said vehicle to move in the second portion of the field in said first direction of travel and away from said crop input source, whereby, as said frame moves in said first direction of travel, said reel rotates in said first rotation direction such that a portion of said length of conduit is unwound from said reel onto the soil surface of the second portion of the field; and driving said drive wheel to cause said vehicle to move in the second portion of the field in said second direction of travel and back toward said crop input source, whereby, as said frame moves in said second direction of travel, said reel rotates in said second rotation direction such that said unwound portion of said length of conduit is rewound back onto said reel, and whereby as said vehicle moves in said second direction of travel, applying said crop input through the plurality of applicators to the second portion of the field at a first application rate.

13. The method of claim 9, further comprising:
measuring an agronomic parameter as the vehicle moves in said first direction of travel or said second direction of travel, said agronomic parameter selected from the group consisting of soil moisture, soil temperature, soil reflectivity, soil color, soil electrical conductivity, soil organic matter, soil cation exchange capacity, crop color, crop reflectivity, crop stalk diameter, crop presence, crop population, crop spacing, and crop uniformity.

* * * * *